G. F. JAUBERT.
GAS GENERATOR.
APPLICATION FILED APR. 28, 1908.
933,077.
Patented Sept. 7, 1909.
2 SHEETS—SHEET 1.
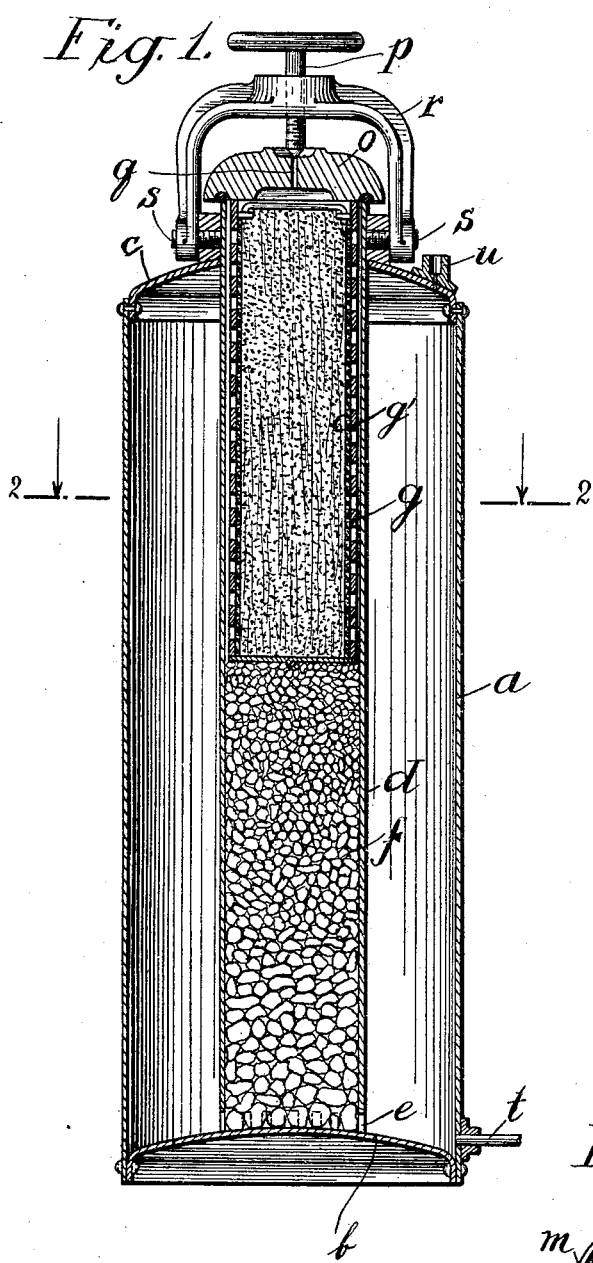
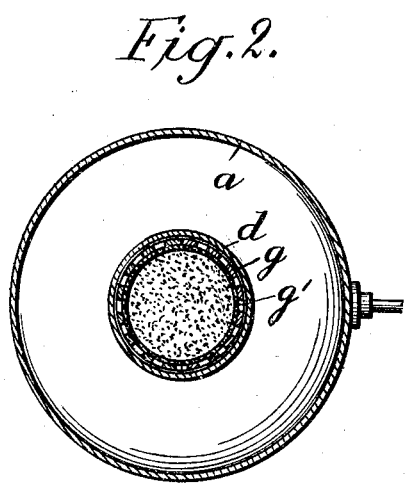
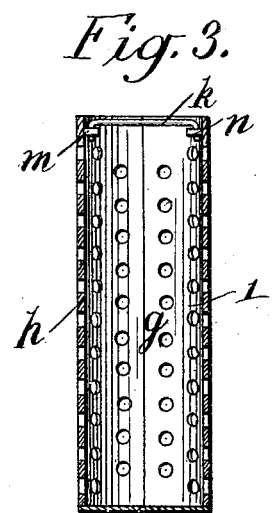
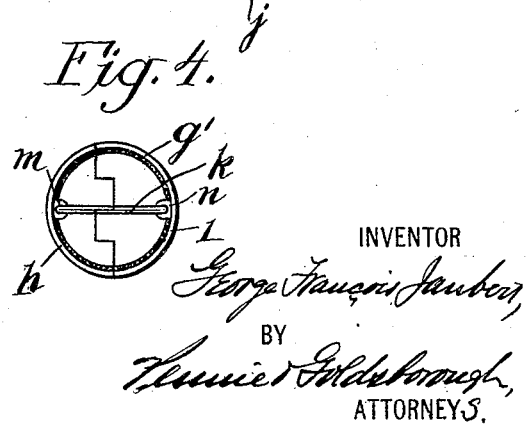
WITNESSES:
William H. Davis
L. H. Barlow
INVENTOR
George François Jaubert,
BY
Tennier Goldsborough,
ATTORNEYS.

G. F. JAUBERT.
GAS GENERATOR.
APPLICATION FILED APR. 28, 1908.

933,077.

Patented Sept. 7, 1909.
2 SHEETS—SHEET 2.

WITNESSES:
William H. Davies
L. H. Barlow.

INVENTOR
George François Jaubert,
BY
Lennie & Goldsborough
ATTORNEYS.

UNITED STATES PATENT OFFICE.

GEORGE FRANÇOIS JAUBERT, OF PARIS, FRANCE.

GAS-GENERATOR.

933,077.  Specification of Letters Patent.  Patented Sept. 7, 1909.

Application filed April 28, 1908. Serial No. 429,593.

*To all whom it may concern:*

Be it known that I, GEORGE FRANÇOIS JAUBERT, a citizen of the Republic of Switzerland, residing at 155 Boulevard Malesherbes, Paris, France, have invented certain new and useful Improvements in Gas-Generators, of which the following is a specification.

This invention has reference to generators for generating gas under pressure by the decomposition of appropriate substances in a closed vessel.

The invention has mainly for its object to provide a compact, simple and economical apparatus, fulfilling all necessary conditions of safety, enabling gas to be withdrawn during the recharging and permitting of utilizing the gas contained in the piping and accessory apparatus at the end of the operations.

Figure 5:
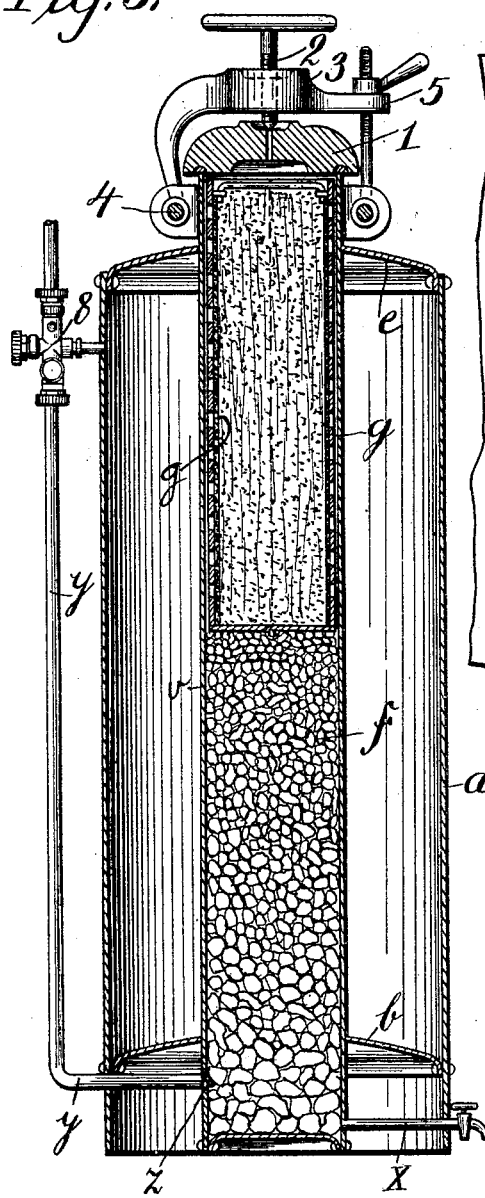
Figure 6:
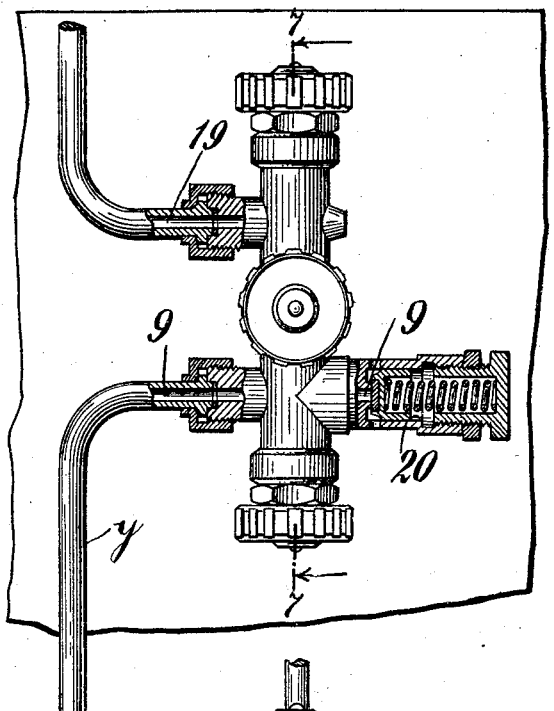
Figure 7:
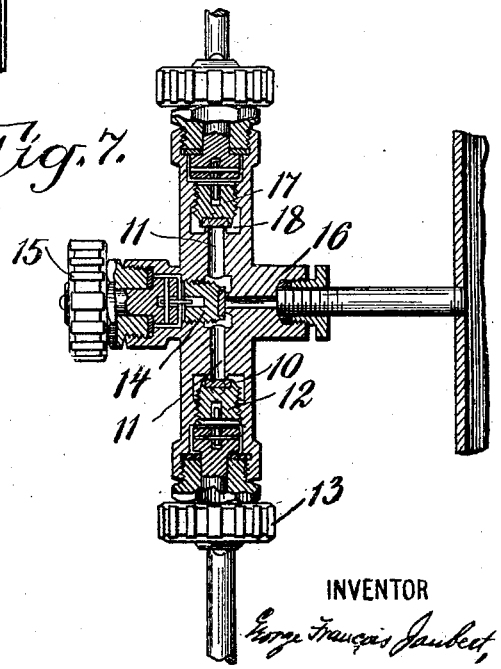

In the accompanying drawing:—Figure 1 represents an axial vertical section through the gas generator. Fig. 2 is a cross section on the line 2—2 of Fig. 1. Figs. 3 and 4 are respectively a vertical section and a plan view of a basket intended for the reception of the products or substances liberating the gas. Fig. 5 is a modified form of generator, and Figs. 6 and 7 are respectively an elevation and a vertical section through the improved distributing cock.

The generator (Fig. 1) comprises a cylindrical reservoir *a* provided internally with a tube *d* resting on the bottom *b* of the reservoir, and passing through the dome *c*. This tube *d* is provided at its lower part with openings *e* establishing communication between the interior of the said tube and the reservoir *a*.

When it is necessary to purify or cool the gas formed, as is the case in the preparation of oxygen by the decomposition of chlorates and perchlorates by auto-combustion, the tube *d* is filled to an appropriate height with pumice stone *f* or similar material upon which a basket *g* rests; this basket is represented in detail in Figs. 3 and 4 and is composed of two semi-cylinders *h* and *i* of perforated sheet metal lined internally with asbestos fabric *g'*. These semi-cylinders *h* and *i* are united at their bottom by a hinge *j* and at their upper part by a hook *k* engaging in lugs *m* and *n* on the two semi-cylinders. The tube *d* is closed by a cover *o* held in position by a pin screw *p* controlling an opening *q* in the cover, and screwed into a yoke *r* pivoted on trunnions *s* solid with the tube *d*. The reservoir *a* is provided at its lower part with a drain orifice *t* and at its upper part with a gas outlet *u*.

The operation in the case of the preparation of oxygen by the process referred to above for example is as follows:—The apparatus being open for charging, pumice stone is introduced into the tube *d* to an appropriate height, pieces being preferably arranged at the bottom which are of sufficient size to prevent an escape through the openings *e*. A suitable quantity (say half a liter) of soda lye is then poured into the tube and after it has impregnated the pumice stone *f* it is withdrawn through the drain socket *t*. The basket *g* filled with material intended to liberate gas in the tube *d* is then introduced and an appropriate kindling charge is then placed upon the material and lighted. The cover *o* is then placed in position and pressed down by the screw *p*. The gas produced by the combustion in a closed vessel of the substance or composition contained in the basket *g*, which thus forms a liberation retort, issues through the perforations in the basket, traverses the layer of pumice stone *f* where it becomes purified in contact with the soda lye and is then liberated through the openings *e* in the reservoir *a* from which it may be withdrawn through the socket *u*.

In order to recharge the apparatus, say when the generating substance has been exhausted, the gas outlet on the socket *u* is closed, whereupon the screw *p* is unscrewed. If at this moment gas under pressure still remains in the reservoir *a*, this gas escapes through the orifice *q* warning the operator who is able to avoid any accident by allowing the pressure to fall and causing the gas to escape through the orifice *q* before removing the cover completely. Charging is then effected as before.

In the modification represented in Fig. 5, the central tube *v* passes through the bottom *b* of the reservoir *a*; it is furnished near its lower extremity with a pipe *x* having a cock for the discharge of the soda lye, and at a certain distance above with a pipe *y* for the gas which is protected by a screen *z*. The cover 1 closing the tube *v* is similar to that in Fig. 1. The pin screw 2 controlling the opening in the cover passes through a dog 3 pivoted upon a trunnion 4 solid with the tube. The other extremity 5 of the dog is secured by means of an ordinary device comprising a hinged bolt. In order to enable the tube $v$ to be recharged without interrupting the consumption of the gas contained in the reservoir $a$, and also to render it possible to utilize directly the gas coming from the tube $v$ without passing through the reservoir, a distributing cock 8 shown in detail in Figs. 6 and 7, is arranged on the pipe $y$.

This cock is provided with an admission passage 9 communicating with the pipe $y$ and terminating in an annular chamber 10 into which there opens a passage 11 controlled by a valve 12 provided with a hand-operated wheel 13. This passage 11 surrounds a valve 14 with hand wheel 15 (Fig. 7) controlling a passage 16 communicating with the reservoir $a$ of Fig. 5. The other extremity of the passage 11 communicates by the intermediary of a valve 17 with a chamber 18 from which a gas supply pipe 19 proceeds. A safety valve 20 is arranged on the passage 9. The passages 11 and 16 are both formed in the single casting which constitutes the body of the three-way cock. The apparatus is completed by the usual pressure reducers and pressure gages.

The charging and discharging of the tube $v$ are effected as above; the operation of the cover 1 and of the pin screw 2 will be obvious. The gas leaving the basket $g$ after having passed through the layer of pumice stone $f$ escapes through the pipe $y$, reaches the distributing cock 8, the valves 12 and 14 of which are open, thus allowing the gas to enter the reservoir $a$. In order to withdraw gas during the liberation, the valve 17 is opened and the valves 12 and 14 are also allowed to remain open. Under these conditions gas may be withdrawn until the charge is exhausted. Recharging is effected by closing the valve 14, keeping 12 and 17 open, and in the first place the gas contained in the scrubber and in the piping is consumed. The valve 12 is closed in order to cut off the interior of the tube $v$ from the place of utilization. The cover 1 may then be opened and charging effected without loss of gas. During the recharging operation gas may still be withdrawn from the gas holder through the open valve 14, the valve 12 remaining closed.

On resuming normal operation after charging, the valve 12 is maintained closed until the pressure in the tube $v$ is equal to or slightly greater than the pressure in the gas holder, which is ascertained either by rendering the safety valve 20 operative or by means of the pressure gages.

The advantages are as follows:—The concentric arrangement of the various parts—basket for the combustible, scrubber, and gas holder, decreases the volume of the apparatus and renders it more portable; it also permits of reducing the thickness of the tube $d$ (Fig. 1) or $v$ (Fig. 4) since these tubes are subjected to internal and external pressures which are substantially equal. The perforated cover controlled by a pin screw constitutes a closing means which obviates the danger of the cover being blown off, as before it can be removed it is necessary to unscrew the screw pin which allows gases under pressure to escape through the safety opening. Finally the distributing cock in Figs. 6 and 7, enables the gas contained in the pipe $y$ to be utilized when the charge contained in the basket $g$ is exhausted so that any loss of gas is prevented. This same arrangement enables the basket to be recharged without interrupting the consumption of gas. It also insures the passage of the gas in one direction, thereby obviating the inconvenience of a return of gas which might cause the scrubbing liquid to enter the basket of the generator.

The reservoir $a$ may be of any suitable metal, such as sheet iron, steel, or the like, stamped or provided with bottoms secured by autogeneous welding. The pipe $y$ (Fig. 5) may be entirely outside the reservoir or it may be inside this reservoir, up to the distributing cock for example.

The invention is applicable to the production under pressure of gases of all kinds, such as oxygen, carbonic acid, hydrogen, acetylene, and generally speaking of all gases resulting from the decomposition by combustion in a closed vessel or otherwise (for example by the action of water) of appropriate substances, products or compositions. It will of course be understood that the cock is equally applicable to generating appliances constituted by distinct parts not arranged one inside the other.

What I claim is:—

1. In a generator for generating gas under pressure by the decomposition in a closed vessel of appropriate substances, a receiver for the gas produced, a tubular chamber within said receiver and extending through the top thereof, a liberating retort at the upper end of the said chamber, an outlet pipe leading from an outlet at the lower end of the said chamber, a body of material for purifying the gases produced interposed between the liberation retort and the outlet, a three-way cock interposed in the outlet pipe and having its passages in communication with the outlet pipe, with the interior of the reservoir, and with a leading-off pipe respectively, and an independent valve in each of said passages; substantially as described.

2. In a generator for generating gases under pressure by the decomposition in a closed vessel of appropriate substances, a generating chamber, a perforated cover therefor, a yoke spanning said cover, and means carried by the yoke for pressing the cover into its closing position and closing the perforation; substantially as described.

3. In a generator for generating gases under pressure by the decomposition in a closed vessel of appropriate substances, a generating chamber, having an opening at one end, a cover for said opening having a central perforation, a yoke spanning the cover, and a pin screw in said yoke adapted to press the cover into its closing position and simultaneously close the perforation; substantially as described.

4. In a gas generating apparatus, the combination with a generator, a receiver, and a pipe connecting the same, of a three-way cock, in said pipe formed of a single casting having a passage leading therethrough to conduct the gas from said pipe to leading-off pipes, and a passage leading from an intermediate point in the first passage to the reservoir, valves to control said first passage at opposite sides of the second passage, and a valve to control the second passage at its junction with the first, without closing the first passage; substantially as described.

In testimony whereof I have hereunto placed my hand this fourth day of March, 1908.

GEORGE FRANÇOIS JAUBERT.

In the presence of two witnesses:
 HANSON C. COXE,
 ALARIK D'ORNHJEHR.